March 29, 1955 — A. S. VOLPIN — 2,705,019
GATE VALVE
Filed July 8, 1950 — 2 Sheets-Sheet 2

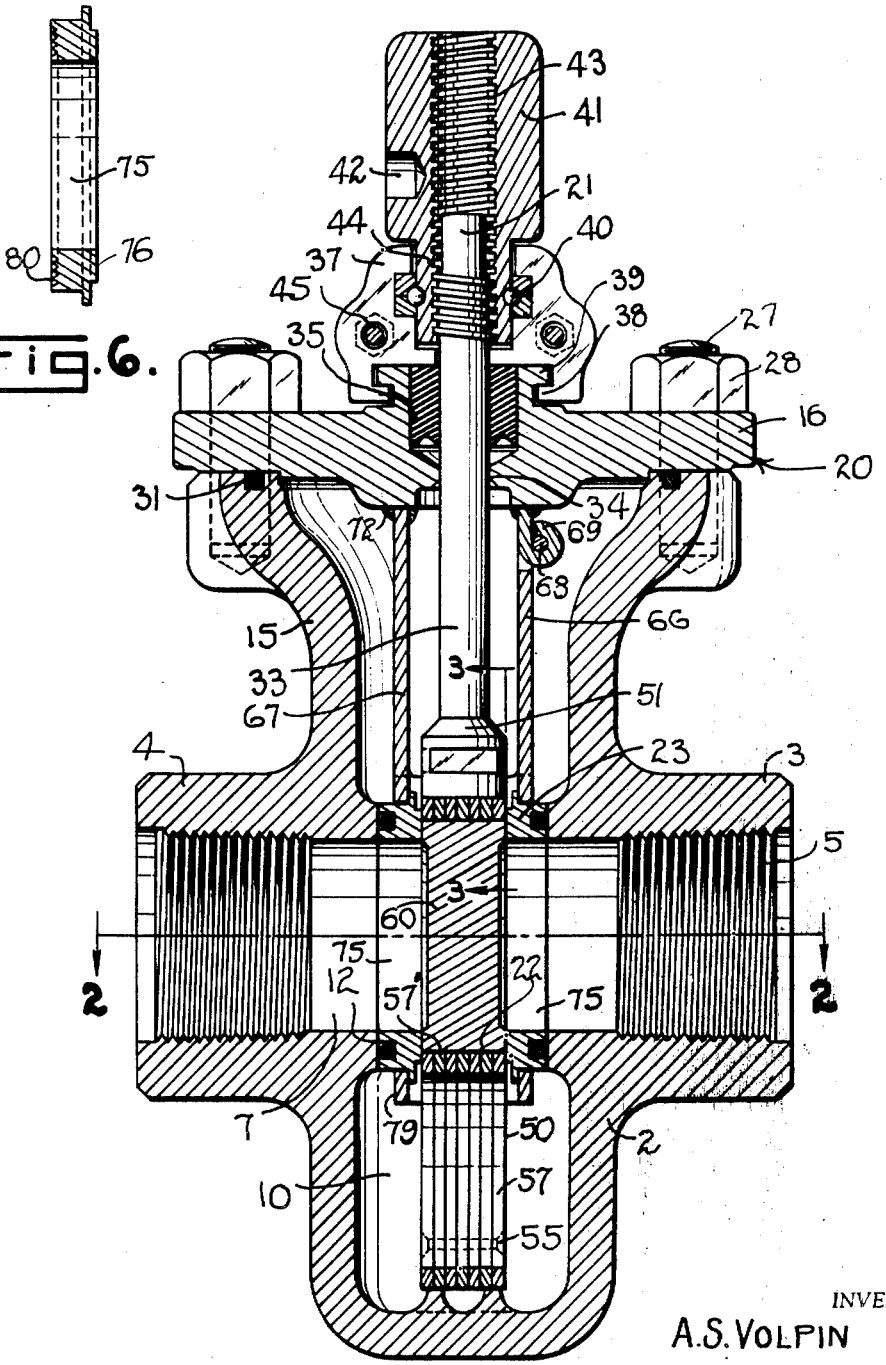

Inventor
A. S. VOLPIN
Lester B. Clark
Ray L. Smith
ATTORNEYS

United States Patent Office 2,705,019
Patented Mar. 29, 1955

2,705,019

GATE VALVE

Alexander S. Volpin, Houston, Tex.

Application July 8, 1950, Serial No. 172,653

13 Claims. (Cl. 137—315)

The invention relates to a gate valve and particularly to a valve where the internal parts subjected to wear may be readily replaced by removing the valve bonnet or closure top.

Gate valves of the general type herein described are inserted in pipe lines to control the flow through the pipe, and it is only natural that the gate and seats are subjected to wear and require replacement.

The present valve is particularly designed to provide a simple and economical construction wherein the gate member is made up of stampings and will require little or no machine work thereon.

Another object of the invention is to provide a gate valve wherein the gate stem and valve seats are all suspended from the valve bonnet or closure so that when the valve is once incorporated in the pipe line that the parts subjected to wear may be readily removed and replaced without disconnecting the valve from the pipe line.

It is another object of the present invention to provide a valve housing bonnet closure member to which the stem, gate and valve seats are connected so that release and removal of the bonnet withdraws all of the working parts of the valve which permits prompt and convenient replacement with factory made standard parts as distinguished from unsatisfactory repair and parts replacement in small field shops.

Another object of the invention is to provide a gate valve bonnet to which the valve seat rings are suspended so as to be positioned on opposite sides of the gate member and to provide a seat seal against the valve housing.

A still further object of the invention is to provide a particular form of gate for gate valves wherein the gate is made up of a plurality of sheet stampings which are laminated together to form the desired form of thickness of gate member.

Another object of the invention is to provide a gate for gate valve wherein the gate has a plurality of ports therethrough with at least one of the ports closed by an insert plug to close the flow through the valve when the plug is moved across the gate passage.

Another object is to provide a closure member for insertion in the gate of a gate valve where a particular material is desired to be contacted by the line fluid.

A still further object of the invention is to provide a bonnet for a gate valve where such bonnet carries the valve stem to which a removable and replaceable gate is connected and wherein also seat rings are carried by the bonnet so that the entire interior working assembly of the valve may be inserted and removed as a unit without disconnecting the valve from the flow line.

A still further object of the invention is to provide a gate valve bonnet to which replaceable seat rings are connected so that the seat rings may be replaced without disconnecting the valve from the pipe line.

A still further object of the invention is to provide a gate for gate valves made up of plates or sheets as lamina so as to provide a laminated gate member of the desired thickness.

It is a still further object of the invention to provide a perforate laminated gate for gate valve.

Another object of the invention is to provide a perforate laminated gate provided with a closure plug in the perforate portion.

Other and further objects of the invention will be readily apparent when the following description is considered in connection with the accompanying drawings wherein:

Fig. 1 is a vertical sectional view taken longitudinally through the valve in the position in which it is connected with the gate member is closed position.

Fig. 6 is a modified form of the seat ring of Fig. 5.

Figure 3:
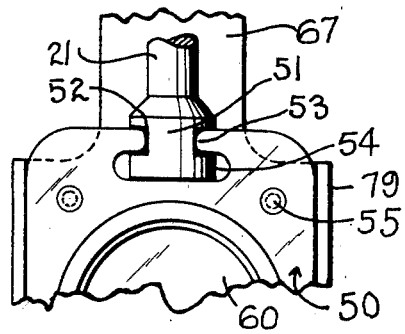
Fig. 3 is a broken detailed section of the stem and gate connection taken on the line 3—3 of Fig. 1.

In providing a simple and economical valve which is particularly adapted for use in pipe lines where the parts are subjected to wear. Great difficulty has been encountered heretofore in providing a valve wherein the parts to be replaced may be removed and replaced without removing the valve from the pipe line and wherein such replacement parts can be factory manufactured and quickly inserted in the field so as to insure proper service of the valve with the replacement parts.

In many instances, such valves are used upon pipe lines pumping abrasive or corrosive fluids, such, for instance, as the mud lines used in circulating the drilling mud in the rotary method of drilling wells.

The gate valve herein is also adapted for economic construction because the parts have been so constructed and arranged as to eliminate need of expensive machining operation upon many of the parts and the gate member per se requires no machining operations but is made up of stampings, such, for instance, as sheets of suitable material which serve as lamina in the making up of a laminated gate member.

It is also pointed out that the particular portion subjected to abrasion and corrosion can be coated with hard facing so as to obtain the maximum of service.

The valve is so constructed that all of the parts subjected to wear may be removed from the valve body or housing without removing such housing from the pipe line in which it is connected.

It might be pointed out that in any instance where it is necessary to remove the valve body from the pipe line great difficulty, delay, and expense are encountered because it is necessary to divide or open the pipe line at each side of the valve to accomplish its removal. When a valve is removed, it is necessary to insert another valve so that such procedure requires a standby valve which is eliminated by the use of the present valve.

When the general type of valve now in use is to be replaced, it must first be removed from the line and then taken to the nearest repair location, which is often a small field shop not familiar with the character of valve or inexperienced in the repairing operations, with a result that the repaired valve is unsatisfactory or inefficient.

With the present valve, replacement parts are all factory made, may be carried in stock or in a field warehouse so that it is a matter of but a few minutes to remove all of the parts subjected to wear from the valve housing and replace them with standard identical parts from a stock without incurring the inconvenience and expense which have heretofore been necessary in maintaining a suitable valve service.

In Fig. 1 the valve body or housing 2 embodies the usual construction with the pipe recess extensions 3 and 4 at each end, which are threaded at 5 to receive a pipe section which makes up the pipe line.

Such body has a flow passage 7 through which is intersected by a gate chamber 10, transversely of the flow passage and the body is formed with the inward extending seat boss 12 at each side of the gate chamber 10.

The body 2 has the upwardly extending portion 15 which receives the bonnet 16 as best seen in Fig. 1 so that the gate chamber 10 may be closed.

This assembly is affixed to the valve body 2 by the suitable bolts 27 or nuts 28 or may be otherwise affixed so as to provide a seal between the body and the bonnet.

A suitable sealing gasket 31 is shown as disposed between the body and the bonnet.

The closure assembly 20 particularly includes the gate's stem 33, which projects through the opening 34 in the bonnet and a seal is maintained there around by a lip type packing 35, also disposed in the bonnet.

A split clamp retainer 37 has a lip 38 which sets under a flange 39 on the bonnet so as to render the anti-friction bearing 40 about head 41. This head has a recess 42 therein to receive a suitable hand wheel to effect the rotation thereof. This head is internally threaded at 43 to match with a comparable thread 44 on the periphery of the stem 21 so that a rising stem valve is provided.

The portions of this clamp 37 are held together by the through bolts 45.

Figure 2:
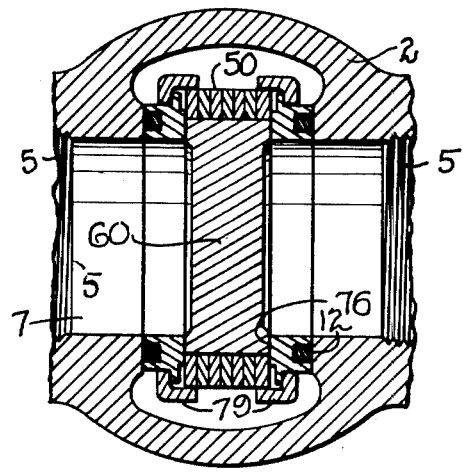
Fig. 2 is a transverse section through the valve body and gate to illustrate the arrangement of the gate, the seats and the valve body, and is taken on the line 2 of Fig. 1.
Figure 5:
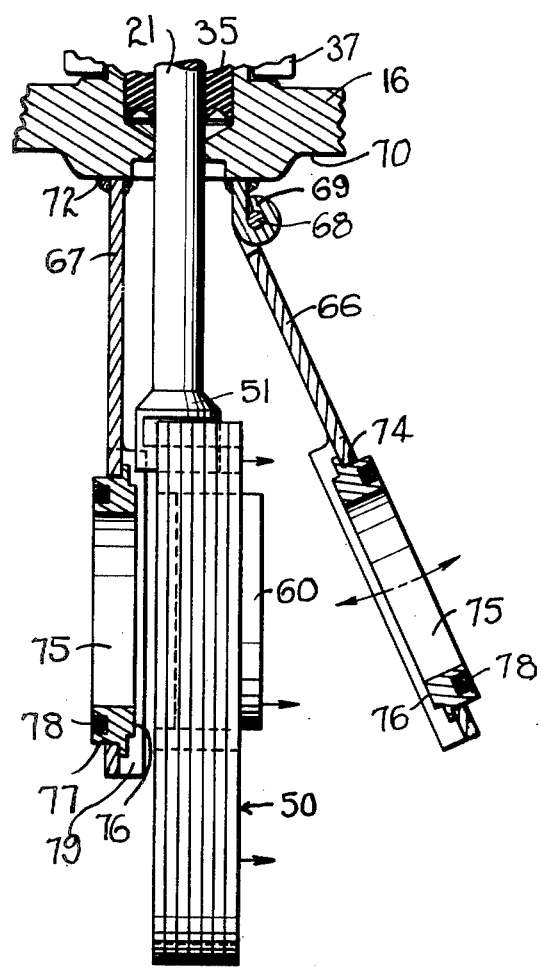
Fig. 5 is the side elevation with part of the bonnet and seat ring supporting plates in section to illustrate the arrangement which permits removal of the gate, of seats and the removable gate closure plug.

A gate 50, best seen in side elevation, Fig. 5, in transverse section Fig. 2 and in vertical section, Fig. 1, is removable, connected to the stem 21, as best seen in Fig. 3.

The stem 21 has a slightly enlarged base 51, which is provided with transverse slots 52 to receive the ears 53 which are created by a slot 54 in the upper end of the gate member 50. This permits the gate to be moved to the right as seen in Fig. 5 so as to slide the gate off the base 51, to permit its ready replacement.

The gate 50 is of a peculiar construction in that it constitutes a unitary member made up of a plurality of sheets of lamina of a desired thickness so that any suitable number thereof may be assembled in superimposed position to provide a gate of the desired thickness.

These lamina may be assembled in closely adjacent positions by any desired suitable means, such as brazing, welding, or any other desired manner, such as for instance, by the rivets 55 seen in the lower portion of Fig. 1 and also in Fig. 3.

The advantage of providing a gate comprising a plurality of sheets or lamina results in the elimination of costly machining of the gate and the user economy afforded by the cheap replacement cost.

If the valve is to be one wherein a gate serves only to block the flow passage through the valve then, of course, the gate member may be imperforate, but on the other hand if the gate member is to extend across the flow port in all positions, such as a through conduit type gate, it must have a portion to effect a closure, and also a perforate portion to permit the passage of the fluid through the valve.

A gate including a perforate portion for the passage of fluid is best seen in vertical section of Fig. 1 where the perforation 57 in the lower end of each plate has been provided. When the gate is in closed position, such perforate area is in the lower portion of the gate chamber as seen in Fig. 1 and the closure portion of the gate 50 is disposed transversely across the flow passage 7 to effect sealing of the flow passage.

In the particular gate of Fig. 1 another perforate area or portion 57' has been provided but has been closed by a plug 60, which may be of any suitable material so as to resist abrasion and corrosion due to line fluids.

This plug in some instances may be of stainless steel, or any suitable material; is readily removeable and may be said to be free floating in the opening or perforate portion 57' of Fig. 1.

On the other hand the upper portion of the lamina may be imperforate as heretofore indicated to serve as a closure.

Figure 4:
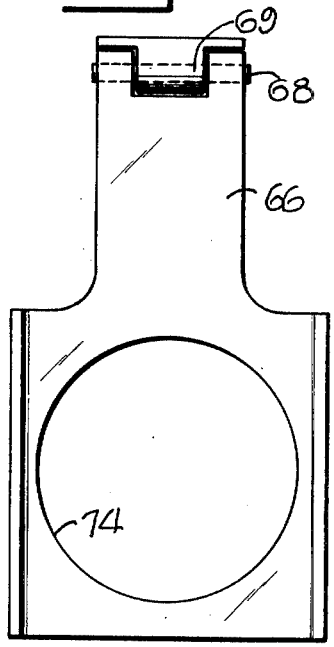
Fig. 4 is a front elevation of one of the valve seat supporting plates which is pivoted upon the valve body bonnet.

In order to insure proper sealing of the gate within the housing, the bonnet assembly 20 is shown as having been provided with a pair of seat ring supporting hanger plates 66 and 67 as best seen in Figs. 4 and 5.

One such plate 66, as seen in Fig. 4, is pivoted upon a bar 68 carried by an ear 69, projecting downwardly from the lower side 70 of the bonnet or closure plate 16.

A distinguishing feature of the valve resides in the arrangement whereby the seat plates 66 and 67 are welded or otherwise affixed at 72 to the inside surface of the bonnet so that the plates 66 and 67 extend downwardly into the chamber into a position parallel with the gate 50 and the seat boss 12 as best seen in Fig. 1. The plates 66 and 67 each have a perforate opening 74 therein, which is arranged to receive the seat ring 75, having a hard faced surface 76 to engage against the closure plug 60 as seen in Fig. 1, or to engage against the exterior surface of the gate 50. In either event, it is intended that a seal is thus created between the gate 50 and the seat ring 75.

To facilitate a seal between the seat ring 75 and the body boss 12, the outer surface of the seat ring 75 is recessed at 77 to receive a suitable packing or O ring 78.

The plate 66 which is pivoted at 68 carries a similar seat ring 75 which may swing away from the gate, as seen in Fig. 5, in order to permit removal and replacement of the gate 50 due to the slotted construction seen in Fig. 3.

When the assembly for closing the valve is ready for insertion, the parts will be in the position of Fig. 1 so that when the assembly is bolted in position by the bolts 27 and nuts 28, the seats will engage the gate and the seat bosses 12 of the housing. The rotation of the head 41 then effects the opening or the closing of the valve by the raising or lowering of the gate.

The seat plates 66 and 67 are each formed with an internal flange 79 as seen in Fig. 2 so as to serve as guides for the sliding movement of the gate 50 as it is raised and lowered.

In some instances the seal ring 78 may be eliminated and the seat rings 75 constructed as shown in the modification, Fig. 6, wherein the outer surface of the seat ring 75 is provided with a type of seal 80 comprising concentric ridges which will fit against the seat boss 12. Such a seat may be provided where high temperatures are encountered, such as in steam valves.

It seems obvious that the proposed valve is capable of use under various circumstances and conditions, such as, for instance, in marine service and wherever it is inconvenient to remove the valve from the line and wherein standard replacement parts are desired for insertion and removal with a minimum of inconvenience.

Broadly, the invention contemplates a simple and economical valve wherein standard replacement parts may be provided and replacements effected without removal of the valve from the line.

What is claimed is:

1. In a gate valve, a housing having aligned flow ports, a removably attached bonnet therefor, a gate, a seat hanger, gate guide means including a raised flange on said hanger, a gate seat supported in said hanger, and means to support said gate and said seat hanger and seat from said bonnet so as to simultaneously remove them from said housing as said bonnet is detached and lifted from said housing, said hanger being hingedly connected to said bonnet for swinging movement relative to the gate.

2. In a gate valve, a housing having aligned flow ports, a removably attached bonnet therefor, a gate, a seat hanger, a gate seat therein, and means to support said gate and said seat hanger and seat from said bonnet so as to simultaneously remove them from said housing as said bonnet is detached and lifted from said housing, said gate having an upper and a lower perforate portion, a closure member in one said portion, and means to move said gate so that one or the other of said portions registers with said flow ports for the closing or opening of said valve.

3. A gate valve, a housing having aligned flow ports, a gate, a bonnet, a stem removably secured to said gate, said stem having a threaded portion thereon extending above said bonnet for upward and downward movement of said gate in said housing, a pair of depending plate-like hangers carried by said bonnet on opposite sides of said gate, at least one of said hangers being hingedly connected to the bonnet for swinging movement relative to the gate, a perforate portion in each said hanger, a seat member removably insertable in each said portion to abut against said flow ports and said gate.

4. A gate valve, a housing having aligned flow ports, a gate, a bonnet, a pair of depending plate-like hangers carried by said bonnet on opposite sides of said gate, at least one of said hangers being hingedly connected to the bonnet for swinging movement relative to the gate, a perforate portion in each said hanger, a seat member removably insertable in each said portion to abut against said flow ports and said gate, and guide means including a raised flange on said hangers for said gate.

5. A gate valve, a housing having aligned flow ports, a gate, a bonnet, a pair of depending plate-like hangers carried by said bonnet on opposite sides of said gate, at least one of said hangers being hingedly connected to the bonnet for swinging movement relative to the gate, a perforate portion in each said hanger, a seat member removably insertable in each said portion to abut against said flow ports and said gate; each said seat member having an inner gate sealing surface, an outer surface to abut said housing, a peripheral groove in said outer surface, a resilient sealing ring therein to seal said seat member against said housing.

6. In a gate valve, a housing having aligned flow ports, a gate, a bonnet, a pair of plate-like hangers depending from said bonnet on opposite sides of said gate, a perforate portion in each said hanger, a seat member removably insertable in each said portion to abut against said flow ports and the adjacent sides of said gate, and hinge means connecting at least one of said hangers to said bonnet for swinging movement relative to said gate upon withdrawal of said gate and hangers from said valve.

7. In a gate valve, a housing having aligned flow ports, a removably attached bonnet for the housing, a gate and a seat hanger depending from said bonnet alongside said gate and hingedly connected to said bonnet for swinging movement relative to said gate, a gate seat in said hanger, said gate, seat hanger and seat being simultaneously removed from said housing as said bonnet is detached and lifted from said housing.

8. A valve having a housing, a bonnet therefor, a flow passage through said housing, a closure for said passage including a removable gate, means to move said closure, a seat to seal said flow passage with said closure, and seat supporting means hingedly connected to said bonnet for swinging movement relative to the gate upon withdrawal of said gate and supporting means from said housing.

9. A gate valve comprising a housing, a flow passage therethrough, a gate chamber intersecting said passage, opposed seat bosses therein, a gate chamber closure for connection to said housing, a gate assembly connected to said closure and including a gate stem projecting through said closure, a gate member removably connected to said stem comprising a plurality of sheets laminated together, a flow port through said gate sheets, a seat ring for each side of said gate to fit between the gate and the seat boss, a seal ring on the outer side of each seat, one of said seats being pivoted to said closure to permit removal of said gate, and rotatable means to raise and lower said stem and gate.

10. An insert assembly to replace the wear parts of a gate valve including a gate chamber closure, a gate stem therein, a gate laterally slidable on and off of said stem, a pair of seat rings, support means therefor depending from the closure on opposite sides of the gate, and means to pivot one of said support means on said closure relative to the gate to permit removal of said gate from said stem.

11. An insert assembly to replace the wear parts of a gate valve including a gate chamber closure, a gate stem supported by the closure, a gate of laminated construction laterally slidable on and off the stem, a pair of seat support hangers depending from the closure on opposite sides of said gate, seat rings mounted in the respective hangers in abutting relation to the adjacent sides of the gate, and pivot means pivotally connecting at least one of the hangers to said closure for swinging movement relative to the gate to permit removal of the gate from the stem.

12. In a gate valve, a housing having aligned flow ports, a removably attached bonnet for the housing, a gate of laminar construction, a seat hanger, a gate seat therein, and means to support said gate and said hanger and seat from said bonnet so as to simultaneously remove them from the housing as said bonnet is detached and lifted from said housing, said gate having an upper and lower perforate portion, a closure member in one of said portions, and means to move said gate so that one or the other of said portions registers with said flow ports for closing or opening said valve.

13. A gate valve, comprising, a housing, a flow passage therethrough, a gate chamber intersecting said passage, opposed seat bosses therein, a gate chamber closure for connection to said housing, a gate assembly connected to said closure and including a gate stem projecting through said closure, a gate member removably connected to said stem comprising a plurality of sheets laminated together, a flow port through said gate, a seat ring for each side of said gate to fit between the gate and the seat boss, one of said seat rings being pivoted to said closure to permit removal of said gate, and rotatable means to raise and lower said gate.

References Cited in the file of this patent

UNITED STATES PATENTS

| 397,751 | Pratt | Feb. 12, 1889 |
| 773,642 | Hayden | Nov. 1, 1904 |
| 1,160,790 | Vampa | Nov. 16, 1915 |
| 1,586,345 | Wilson | May 25, 1926 |
| 1,593,325 | Atwood | July 20, 1926 |
| 1,611,844 | Wilson | Dec. 21, 1926 |
| 1,647,734 | Kelly | Nov. 1, 1927 |
| 1,871,965 | Du Bois | Aug. 16, 1932 |
| 1,898,935 | Brandriff | Feb. 21, 1933 |

FOREIGN PATENTS

| 178,851 | Switzerland | 1935 |